(12) United States Patent
Fitzpatrick et al.

(10) Patent No.: US 7,272,139 B2
(45) Date of Patent: Sep. 18, 2007

(54) FAST PATH ROUTING IN A LARGE-SCALE VIRTUAL SERVER COMPUTING ENVIRONMENT

(75) Inventors: Michael G. Fitzpatrick, Raleigh, NC (US); Jeffrey Douglas Haggar, Holly Springs, NC (US); Bala Rajaraman, Cary, NC (US); Arthur James Stagg, Raleigh, NC (US); Jerry Wayne Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 10/045,559

(22) Filed: Jan. 11, 2002

(65) Prior Publication Data
US 2003/0133449 A1  Jul. 17, 2003

(51) Int. Cl.
*H04J 3/16* (2006.01)
(52) U.S. Cl. ....................... 370/392; 370/469
(58) Field of Classification Search ................ 370/389, 370/392, 401, 465, 469
See application file for complete search history.

(56) References Cited

U.S. PATENT DOCUMENTS

| | | | | |
|---|---|---|---|---|
| 5,452,292 A | * | 9/1995 | Okanoue et al. | 370/403 |
| 6,049,834 A | * | 4/2000 | Khabardar et al. | 709/242 |
| 6,172,981 B1 | * | 1/2001 | Cox et al. | 370/401 |
| 6,480,468 B1 | * | 11/2002 | Kishigami et al. | 370/230.1 |
| 6,614,795 B1 | * | 9/2003 | Jimmei et al. | 370/401 |
| 6,912,223 B1 | * | 6/2005 | Sloane | 370/401 |
| 6,948,003 B1 | * | 9/2005 | Newman et al. | 709/250 |

* cited by examiner

*Primary Examiner*—Huy D. Vu
*Assistant Examiner*—Christine Ng
(74) *Attorney, Agent, or Firm*—Stevens & Showalter

(57) ABSTRACT

Methods, systems, and computer program products for improving data transfer in complex computing environments. Internal routing enhancements are defined, which enable traffic of virtual servers to be processed more efficiently, thereby improving overall data transfer rates. Instead of performing routing operations in the Internet Protocol ("IP") layer of a networking stack, a "mini-routing" table is created programmatically and is used to perform routing at the Data Link Control ("DLC") layer. This technique avoids bottlenecks in the IP layer and speeds the data transfer process.

15 Claims, 10 Drawing Sheets

FIG. 10

| | Dest. IP Addr. | DLC-in | DLC-out | Other Info. |
|---|---|---|---|---|
| | *1011* | *1012* | *1013* | *1014* |
| *1020* | 1.2.3.4 | X *1022* | Y *1023* | |
| *1030* | 1.1.2.2 | Y | X | |

*1000*
*1010*

FAST PATH ROUTING IN A LARGE-SCALE VIRTUAL SERVER COMPUTING ENVIRONMENT

BACKGROUND OF THE INVENTION

1. Field of the Invention

The present invention relates to computers systems, and deals more particularly with methods, systems, and computers program products for improving data in a virtual server environment of a computing network through use of internal enhancements.

2. Description of the Related Art

In today's rapidly evolving world, there is an ongoing shift from traditional wholly-owned data centers to an environment where businesses contract for such services to a Service Provider ("SP"). The SP market space is segmented into multiple market spaces, such as Storage Service Providers (SSP), Application Service Providers (ASP), etc. In recent years, the overall SP market has been undergoing annual growth rates in the double digits. A primary reason for this growth is the skyrocketing popularity of the Internet and World Wide Web, and the tendency of businesses to use service providers to support network traffic in this environment.

SP response to the growth in the size of their customer base has traditionally been to add a new server per customer. The value point of this approach was that it provided incremental growth on a per-customer basis, such that the capacity of the additional server would be proportional to the initial requirements of the new customer. Further, customer isolation was assured on a physical boundary. This approach has been termed a "horizontal growth" path due to the additional build-out of servers, storage devices, and network interfaces required to support an expanding customer base.

Over time, this approach has grown less and less desirable due to growth inhibitors which include:

(1) Complexity: As the number of customers associated with a given data center grew, the problem of adding required support services grew even more complex. Issues such as the under-utilization of network attachment media and inefficient allocation of storage resources became a major problem.

(2) Economics: Addition of new servers required the extension of the network access infrastructure—such as switches, routers, and long-line connections—for supporting those servers. The ability to share these resources was limited due to the isolation of each customer-specific platform.

(3) Profitability: SPs began to find their profit potential constrained due to the increased costs caused by the increased complexity and decreased efficiency cited above. However, increased complexity and decreased efficiency at the SP facility did not justify charging customers higher fees, and thus the customer's price point remained constant, leading to reduced profitability for the SPs.

To address these problems, the concept of the "virtual server" was created. In this context, a virtual server is a logical entity that resides upon a traditional server platform. One or more virtual servers can concurrently share the network, system, and storage resources owned by the "real" platform. This approach reduced complexity for the SP's environment by reducing the need for additional external resources to be added to the system every time a customer was added or an existing customer required more resources. (It should be noted that virtual servers may be used to support complex computing environments other than those found in SP facilities, and thus reference herein to problems encountered by SPs is for purposes of illustration and not of limitation.)

Until recently, this state of affairs served nicely, meeting SP requirements by allowing them to effectively meet their customer requirements. However, technology does not stand still, and virtual server support has now reached the point where hundreds—and in some cases thousands—of virtual servers can reside on a single "real" platform. In these high-end environments, the effect of the presence of multiple virtual server instances can no longer be hidden from the network infrastructure. FIG. 1 depicts such an environment, and demonstrates the impact of the multiple virtual servers to the network interface. As shown therein, the network adapter 150 must provide concurrent active service to all "n" virtual servers, where "n" may be potentially thousands of virtual servers (represented in FIG. 1 by virtual servers 110, 120, 130, 140), and this service must be available without regard to actual traffic patterns of individual virtual servers. Note also that the traffic of the collection of virtual servers cannot exceed the actual capacity of the network adapter. This leads to inefficiency in actual data transfer caused by the adapter spending excess time servicing relatively small amounts of data per virtual server. The traditional approach to this problem relies on resolving this inefficiency via the addition of more network adapters, such that each adapter handles traffic for a subset of the virtual servers. The result of this approach, however, is that the complexity and cost factors cited earlier are reborn in the virtual server environment.

Accordingly, what is needed is a solution for the virtual server environment that supports large numbers of virtual server instances while still providing efficient data transfer for these virtual servers, and which does not suffer from (or re-introduce) the problems which have been described.

SUMMARY OF THE INVENTION

An object of the present invention is to define improved data transfer techniques for complex and/or large-scale computing environments.

Another object of the present invention is to provide improved data transfer in systems which include large numbers of virtual servers.

An additional object of the present invention is to provide improvements in data transfer without addition of extra hardware.

Still another object of the present invention is to provide improved data transfer using internal routing enhancements.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving data transfer in computing networks. In preferred embodiments, this comprises providing a concentrator that combines traffic from a plurality of virtual servers into a single outbound stream and routing packets of the combined traffic. Routing the combined traffic preferably further comprises: intercepting packets of the traffic at a data link layer of a communications protocol stack; comparing a destination address of each intercepted packet to entries in a data link layer routing table; forwarding the intercepted packet to a higher layer of the communications protocol stack if no matching entry is found by the comparison, for routing by the higher layer; and performing data link layer routing of the intercepted packet, without intervention of the higher layer, if a matching entry is found by the comparison.

Performing the data link layer routing preferably further comprises: replacing the inbound packet header of the intercepted packet with an outbound packet header using information from the matching entry, thereby creating a modified packet header; and forwarding the intercepted packet using the modified packet header.

According to preferred embodiments, the entries in the data link layer routing table are dynamically learned. Selected entries may be deleted from the data link layer routing table when the selected entries become obsolete.

The present invention may also be used advantageously in methods of doing business, for example to provide improved service provider offerings whereby data transfer rates are improved.

The present invention will now be described with reference to the following drawings, in which like reference numbers denote the same element throughout.

BRIEF DESCRIPTION OF THE DRAWINGS

FIG. 10 depicts a sample table data structure that is representative of an internal "mini-routing table" used by preferred embodiments of the present invention to perform link layer routing.

DESCRIPTION OF PREFERRED EMBODIMENTS

The present invention discloses novel and advantageous techniques for improving data transfer in complex computing environments. Internal routing enhancements are defined, which enable traffic of virtual servers to be processed more efficiently, thereby improving overall data transfer rates. Before describing details of the present invention, a bit of background will now be provided on the virtual server environment in which preferred embodiments operate.

Figure 1:
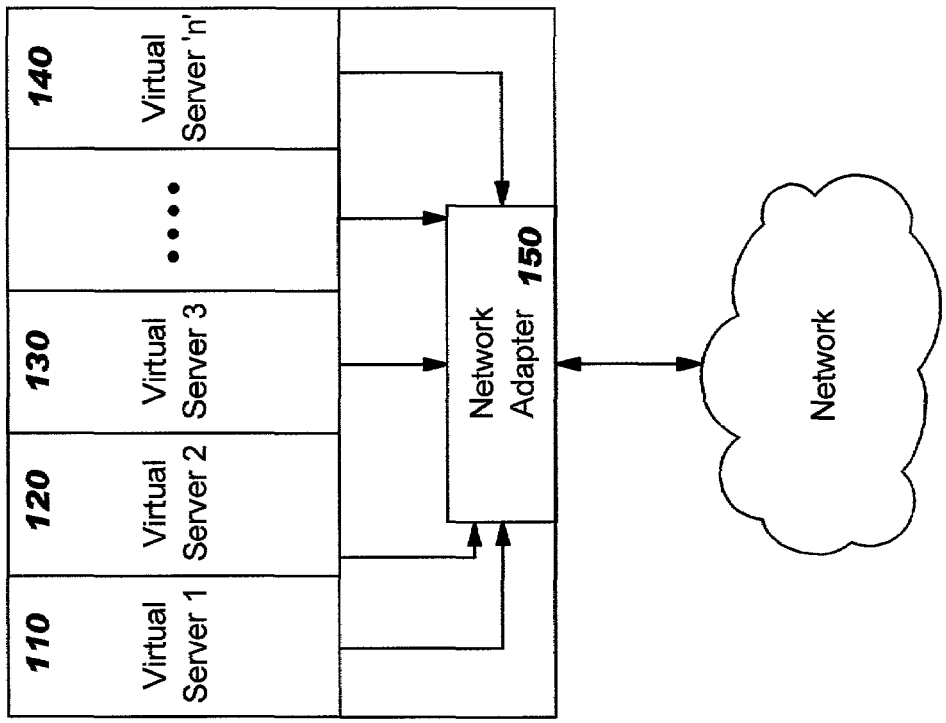
FIG. 1 is a schematic diagram showing multiple virtual servers using a single network adapter, according to the prior art.

To address problems of prior art virtual server environments, such as those discussed earlier with reference to FIG. 1, a "virtual internal network" was defined. This virtual internal network operates as an internal process and combines data streams from a potentially large number of virtual servers (referred to equivalently herein as "hosts") into a single data stream that can, in turn, be presented to the network adapter for delivery to the network. Effectively, this approach masks the presence of multiple virtual server instances from the local network adapter and, therefore, from the external network. Using this virtual internal network, the number of addresses required in the virtual server environment is greatly reduced, thereby increasing connectivity and scalability.

This virtual internal network (hereinafter, "VIN") may be used in systems designed according to a virtual network architecture and/or systems which support multiple operating system images. One example of such a system is the IBM® eServer zSeries 900, or z900, a mainframe computer designed specifically for the needs of large-scale computing environments such as those which support e-business or e-commerce. The z900 allows thousands of virtual servers or hosts to operate within one physical device, enabling it to meet the large-scale computing needs of customers such as technology hosting companies, application service providers, Internet service providers, and other types of service providers. The present invention may also be used advantageously in systems of this type, and is described herein with reference to the virtual network architecture defined for the z900.

Figure 2:
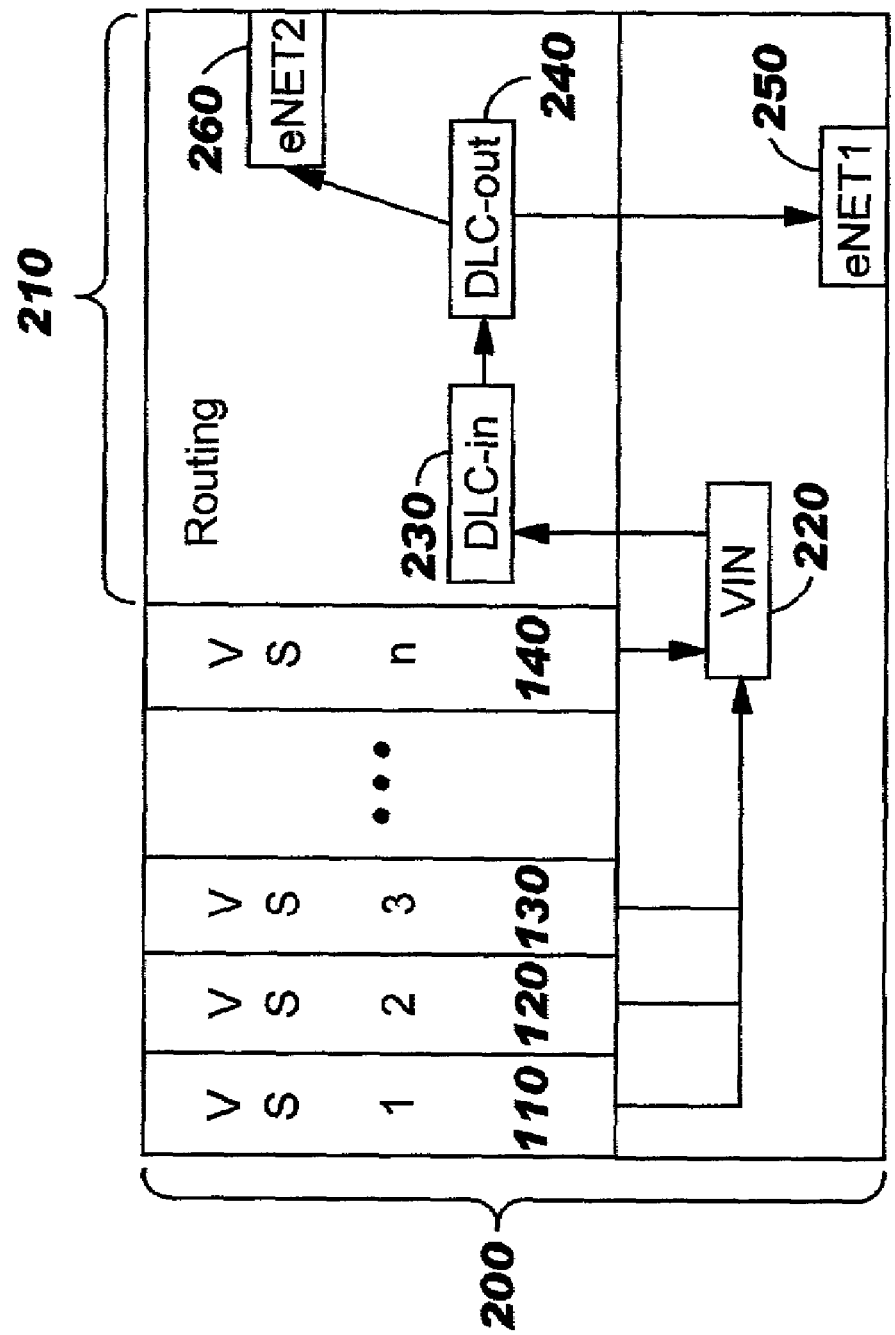
FIG. 2 is a schematic diagram showing placement of the present invention in a multiple virtual server environment.

FIG. 2 provides a diagram depicting a general embodiment of the processes disclosed herein, shown generally at 210, in a computing device 200 which supports multiple virtual servers 110, 120, 130, 140. Computing device 200 preferably represents a mainframe computer such as the z900. (FIG. 2 is not intended to illustrate a complete computing device 200, but instead provides those aspects which are pertinent to discussion of the present invention.) FIG. 2 also depicts placement of the VIN 220 of the prior art in computing device 200. Referring in particular now to the z900 mainframe, the VIN 220 of the prior art provides an enhanced I/O subsystem for dealing with its large number of processors, thereby providing efficient host-to-host connectivity, and the routing enhancements 210 of the present invention enable optimizing the data transfer processing for the virtual servers which are supported therein. The VIN 220 which is implemented as a feature of the z900 is known as "HiperSockets™", and allows for interchanging data between the multiple operating system images within a z900 server (and therefore among the virtual servers executing in those images), without requiring any physical cables or an external network connection. (For example, data may be transferred from one Linux™ image to another, or between a Linux image and a z/OS image, where "z/OS" is a 64-bit operating system developed by IBM.) The HiperSockets feature enables TCP/IP messages to be exchanged between images using memory-to-memory transfers for packet transmission, effectively putting a virtual internal network within the z900 system. Because no external network transmission is required for these exchanges, significant performance improvements can be realized. ("IBM" is a registered trademark, and "HiperSockets" is a trademark, of the International Business Machines Corporation. "Linux" is a trademark of Linus Torvalds.)

HiperSockets is referred to equivalently herein as "iQDIO", or "Internal Queued Direct Input/Output". The HiperSockets technology is described in commonly-assigned U.S. patent application Ser. No. 09/677,454, filed Nov. 2, 2000 (now U.S. Pat. No. 6,854,021), entitled "Communications Between Partitions Within a Logically Partitioned Computer", which is hereby incorporated herein by reference.

The HiperSockets VIN of the prior art enables dynamic addition and deletion of virtual servers, in a manner which is transparent to the network adapter and the external network. Effectively, the HiperSockets VIN restores the efficiencies which originally drove the creation of the virtual server processing model. This approach provides a number of advantages over prior art solutions, including:

(1) Reduced server resource requirements (e.g. storage buffers and thread scheduling) via the replacement of real data transfers to/from the network adapter with logical queue mechanisms.

(2) Decreased adapter costs by increasing the number of virtual servers a single adapter can service efficiently, which in turn decreases the number of adapters required.

(3) Decreased network cost by virtue of a decreased number of switch and router ports required, as a consequence of the decrease in the number of adapters which are required.

(4) Decreased management costs due to concentrating function within the known environment of the server, instead of increasing the number of external entities (i.e. adapters, network ports, network adapters, etc.) which must be managed.

HiperSockets functions to very efficiently transfer packets internally among the virtual servers. The present invention enhances use of HiperSockets, and in particular of the combined traffic flow that results from use of VIN 220, for traffic being sent to (or received from) external networks. According to preferred embodiments, a separate logical partition (or "LPAR") of computing device 200 is used to execute the processing of the routing functions and the routing enhancements of the present invention. (Each of the virtual servers executes in its own LPAR as well.) In the outbound direction, traffic generated by the virtual servers 110, 120, 130, 140 is sent from the VIN 220 to a "DLC-in" function 230, and according to preferred embodiments of the present invention, is then sent directly to a "DLC-out" function 240, before being sent to an external network (represented by elements 250, 260) for delivery to a target destination such as a client device. The external networks 250, 260 (depicted using generic terms "ENET1" and "ENET2") may be Ethernet LANs, Token Ring LANs, wide area networks ("WANs") and so forth, and a corresponding physical adapter is provided for transmitting data between computing device 200 and each external network. This is in contrast to prior art routing, which must send all outbound traffic from the VIN 220 through a TCP/IP stack (to its IP layer) for determination of routing information before transmitting the traffic for external delivery. Inbound processing is analogous. That is, prior art inbound traffic must be processed by the TCP/IP stack, up through and including its IP layer, before forwarding the traffic on to the VIN 220 for delivery to the appropriate virtual server 110, 120, 130, 140; the present invention, on the other hand, enables the inbound traffic to be transferred directly from DLC-out 240 (which is functioning as a "DLC-in" this case) to DLC-in 230 (which is functioning as a "DLC-out").

Figure 3:
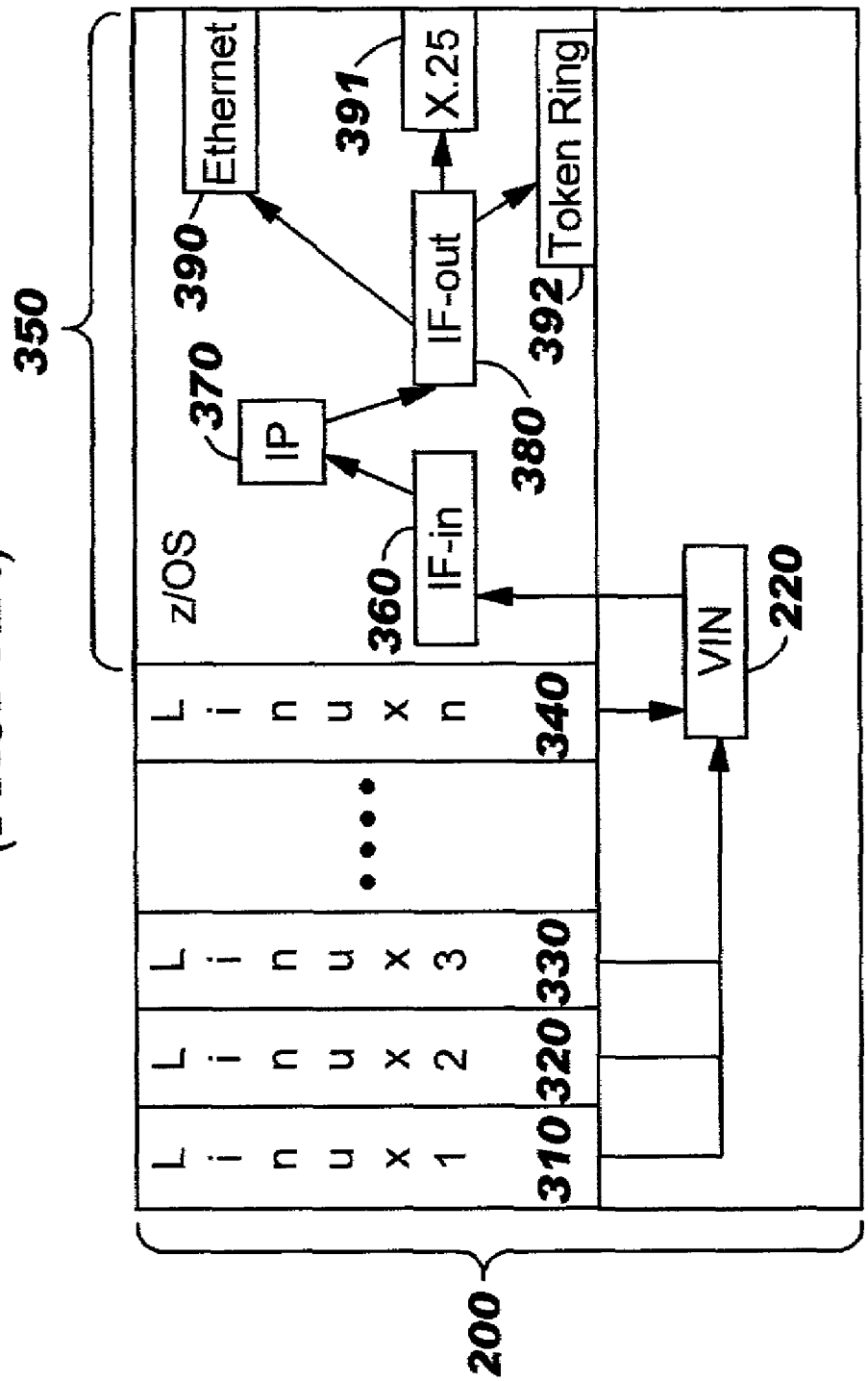
FIG. 3 illustrates routing functions performed within a multiple virtual server environment of the prior art.

FIG. 3 illustrates the prior art technique for using VIN 220 in a computing device 200 where the virtual servers 310, 320, 330, 340 use Linux images and a z/OS image 350 is used to perform routing of the combined traffic of these servers. Illustrating processing of outbound traffic, FIG. 3 shows that traffic from servers 310 through 340 is concentrated into a single output by VIN 220, and this output is sent to an "IF-in" process 360. This process 360 may be thought of as a buffer interface between VIN 220 and IP layer 370, from which packets are forwarded through the TCP/IP stack to its IP layer 370. Routing information is then looked up for this packet's destination and the packet is routed, using techniques which are well known in the art. The packets are then sent to a process designated as "IF-out" 380 (which serves as an output buffer between IP layer 370 and a DLC-specific component or adapter), and from there are sent to the appropriate data link control layer (or "DLC") component 390, 391, 392, depending on the destination of the packet. By way of example, FIG. 3 shows DLCs for Ethernet (element 390), X.25 (element 391), and Token Ring (element 392).

While the scenario shown in FIG. 3 has many advantages over prior systems, a drawback of this approach is that all traffic between the virtual servers and the external network must be routed through the TCP/IP stack (as has been discussed). The overhead of this routing can create a bottleneck in the stack, thereby degrading overall performance of the data transfer operation.

Figure 4:
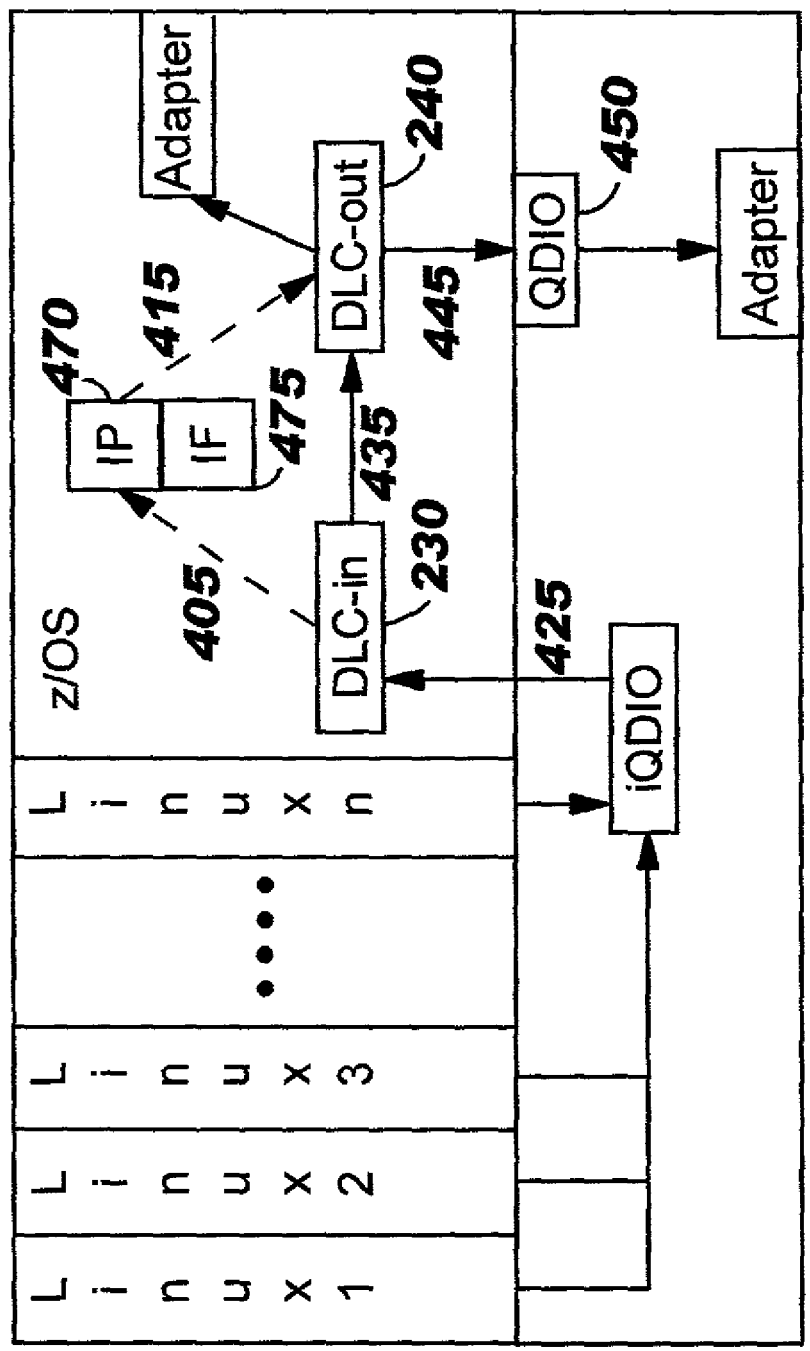
FIG. 4 illustrates enhanced routing functions performed within a multiple virtual server environment, according to preferred embodiments of the present invention.

Turning now to FIG. 4, operation of the present invention may be contrasted with the prior art scenario of FIG. 3. Note that the IP layer 470 (which preferably includes adaptations for supporting the present invention; see the discussion of FIGS. 8 and 9, below) is present in the scenario of FIG. 4, and has an interface "IF" layer 475. Most data transfer bypasses IP layer 470 and IF layer 475, however; instead, outbound data is forwarded 435 from DLC-in 230 to DLC-out 240 (as briefly discussed with reference to FIG. 2, above). In some limited cases, the data must continue to be sent to the IF layer 475 and IP layer 470, as shown by the dotted lines 405, 415, as will be described in more detail below. (Inbound processing is analogous.)

According to the present invention, a "fast path" routing process is provided to enable optimizing data transfer to and from the set of virtual servers. As shown by arrows 425, 435, 445, actual data transfer occurs at the DLC layer (for a selected set of DLCs), bypassing the system overhead incurred during a prior art "normal" routing process as illustrated by FIG. 3. Effectively, the TCP/IP stack is not "touched" during mainline data path processing (except for the limited cases represented by arrows 405, 415, as will be described). This is achieved by providing a small routing table (referred to equivalently herein as a "mini-routing table") in the DLC layer that is used to go from one DLC instance to another. At the point where the DLC would normally present a set of packets to the stack, the DLC according to the present invention calls a special DLC routing exit which parses through the packets and, for each one, performs a look-up in the mini-routing table. For each packet which is to be routed over one of the supported DLCs (a condition which is indicated by the presence of an entry in the mini-routing table for the source/destination DLC pair of this packet), the DLC routing exit replaces the inbound DLC-specific media header with the appropriate outbound DLC media header and transfers the packet directly to the outbound DLC.

Reference is now made to the flowcharts in FIGS. 5-9, which depict logic that may be used to implement preferred embodiments of the present invention.

Figure 5:
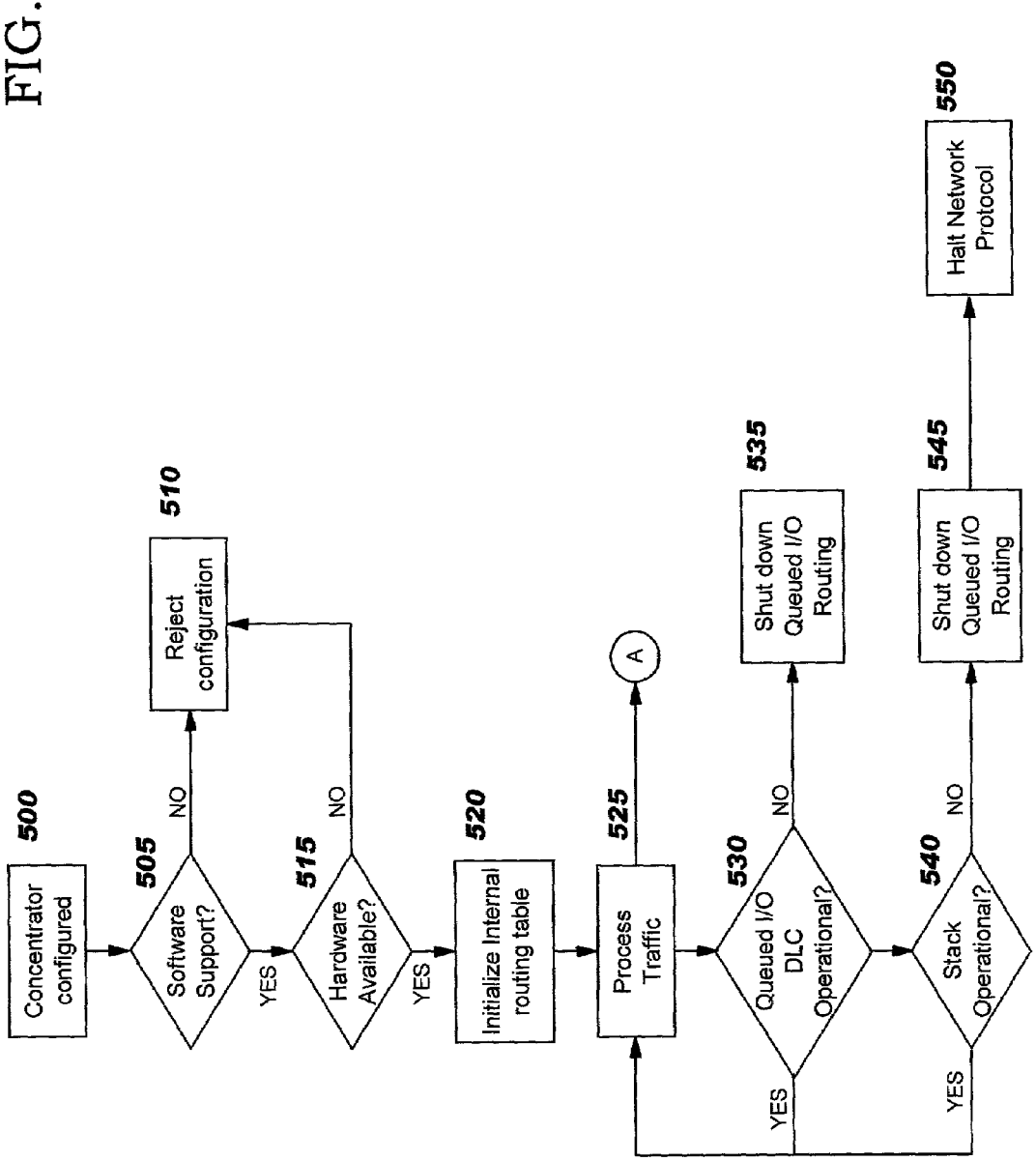
FIGS. 5-9 provide flowcharts depicting logic that may be used to implement preferred embodiments of the present invention.

FIG. 5 depicts processing which may operate to activate the routing enhancements of the present invention. At Block 500, a concentrator function such as VIN 220 (ie. a function which concentrates traffic of multiple virtual servers into a single path) is configured, causing it to be operational. In preferred embodiments, this configuration is provided by an administrator and comprises information such as system definition statements having semantics to indicate that the concentrator should be activated; what kind of DLCs are to be supported; release levels, if appropriate; etc. Block 505 then checks to see if software support for the concentrator function is present. If note the configuration is rejected (Block 510), and the enhanced routing techniques of the present invention will not become operational. Similarly, Block 515 checks to see if hardware support for the configuration is available, and if not, the configuration is rejected. Note that in preferred embodiments, the successful completion of the software and hardware checks include multiple supported DLCs such that the required inbound and outbound traffic flow are provided for. That is, for each pair of DLCs (an inbound DLC and an outbound DLC) for which the fast path routing of the present invention is to be performed, it is necessary to ensure that both of those DLCs are actually supported.

For purposes of illustration, the discussions herein refer to the fast path routing as occurring between the following DLCs: (1) the HiperSockets or VIN 220 DLC, which is referred to equivalently herein as the "iQDIO DLC", and (2) the "QDIO", or "Queued Direct I/O", DLC. However, other DLC types (including another instance of an iQDIO DLC) may be substituted for the QDIO DLC without deviating from the scope of the present invention. Therefore, use of the term "QDIO DLC" herein is not meant to limit the invention.

When discussing fast path routing in the outbound direction, the discussions herein of the iQDIO DLC correspond to DLC-in and the QDIO DLC corresponds to DLC-out. When discussing fast path routing in the inbound direction, the QDIO DLC corresponds to DLC-in and the iQDIO DLC corresponds to DLC-out.

If the software and hardware support is present (i.e. the tests in Block 505 and 515 both have a positive result), processing reaches Block 520 where the mini-routing table of the present invention is initialized. This initialization preferably comprises allocating storage for routing table entries and initializing a "start of table" pointer to point to the allocated storage. The entries in this table are learned dynamically, according to preferred embodiments, using the techniques represented by FIG. 8. Preferably, a single mini-routing table is used for the entire computing device, and is shared by all DLCs operating within the partition which performs routing for that device. Very high performance can be obtained by executing the table-processing logic as a serial, non-interruptible process, thereby avoiding the need to use locking.

Figure 6:
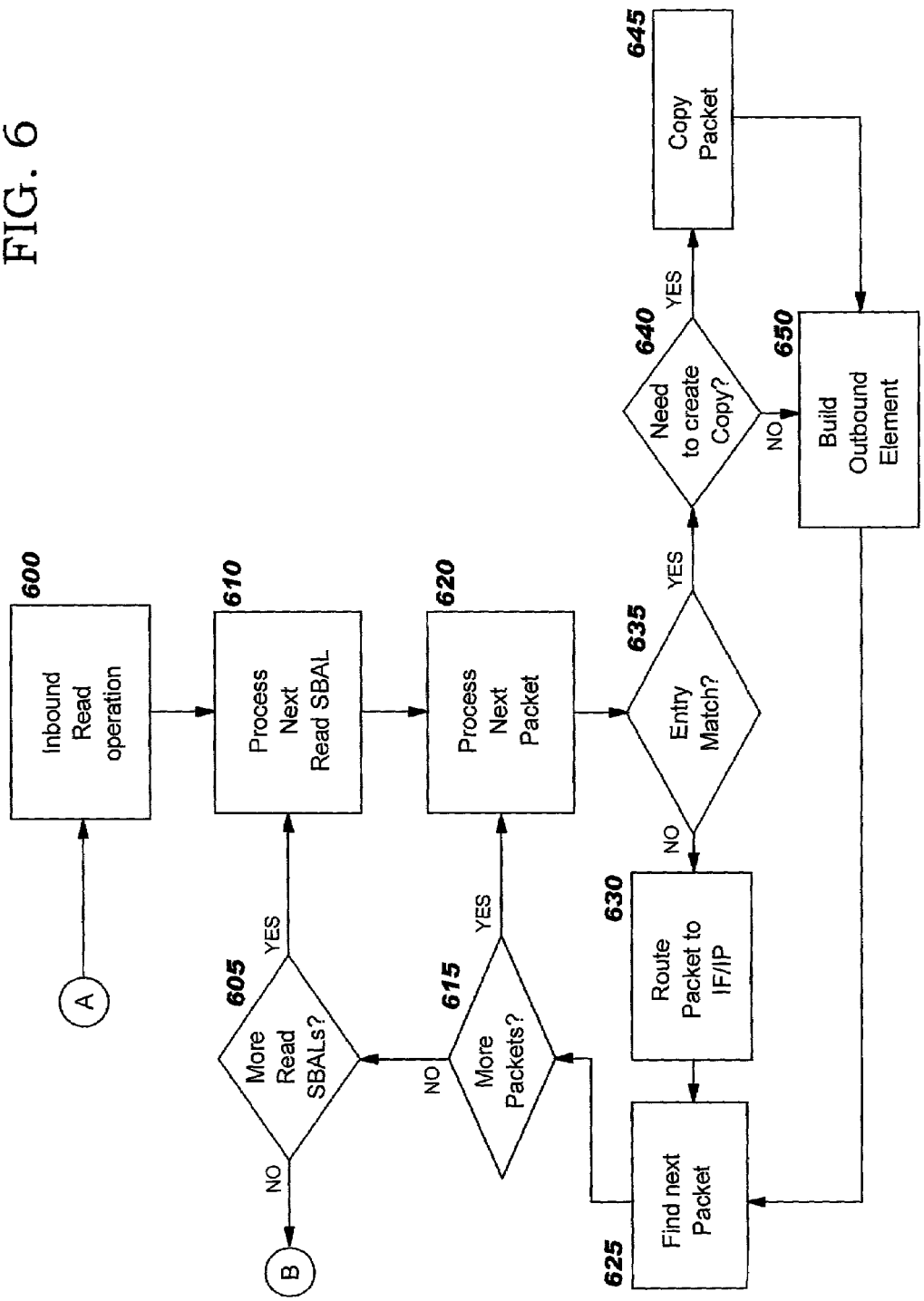

Block 525 indicates that traffic for the virtual servers is processed, as shown in more detail in FIG. 6. (FIG. 6 represents logic of the DLC routing exit which was discussed earlier.) At the same time, the logic of Blocks 530 and 540 executes to monitor the operational status of the system. Block 530 checks to see if the QDIO DLC (represented by DLC-in 230 and DLC-out 240 of FIGS. 2 and 4) remains operational. (When some other type of DLC is used with the iQDIO DLC, then Block 530 is adapted to pertain to that other DLC. Use of the fast path routing techniques of the present invention requires that both of the DLCs between which packets are being routed, exemplified by the QDIO DLC and the VIN 220 DLC, are operational. If one or both is not, then it is not possible to route between the DLC-in and DLC-out, and thus routing must take place at the IP layer as in the prior art.) If the test in Block 530 has a negative result, then Block 535 shuts down the enhanced routing of the present invention and preferably purges the mini-routing table. Routing then continues using prior art techniques (such as those illustrated in FIG. 3).

Block 540 checks to see if the TCP/IP stack remains operational. If not, then Block 545 shuts down the enhanced routing, as described with reference to Block 535, and Block 550 then halts the network protocol. Preferably, a system abort routine is triggered as well, and operation of the system ceases.

Turning now to the DLC routing exit logic depicted in FIG. 6, the traffic processing operation begins at Block 600, where an inbound read is performed to obtain data from the DLC-in buffer. (Note that this processing applies for inbound traffic as well as for outbound traffic, where the difference is in which buffer is considered "DLC-in".) Block 610 begins the processing for a first "SBAL" from the data which was read in Block 500. "SBAL" is an acronym for "storage block address list" and refers to a logical group of data packets. Each read operation may retrieve one or more of these SBALs.

On the first pass through Block 620, the first data packet from the SBAL is located and processed. Block 635 compares the destination address from this data packet to the entries in the mini-routing table. If a match is found (that is, the mini-routing table has an entry mapping the DLC-in on which the packet was received to the DLC-out specified by the packet's destination address), an indicator associated with the packet is preferably set to convey that fast path routing is in use for this packet. Control then transfers to Block 640, which is discussed below. Otherwise, when there is no match (i.e. the test in Block 635 has a negative result), control transfers to Block 630 which sends the packet to the IF layer and IP layer components (see elements 475 and 470 of FIG. 4) for creating the outbound routing information using prior art techniques.

Note that while FIG. 6 shows that fast path routing will be performed whenever there is already an entry in the mini-routing table (i.e. whenever the test in Block 635 has a positive result), there may be situations in which it is preferable not to perform fast path routing. As examples, if a packet requires fragmentation or if there is presently not enough storage available for building outbound elements, then routing is preferably performed as in the prior art. There may be additional or different situations which are pertinent for a particular implementation of the present invention. It will be obvious to one of ordinary skill in the art how the logic shown in FIG. 6 can be modified to account for these situations.

Figure 8:
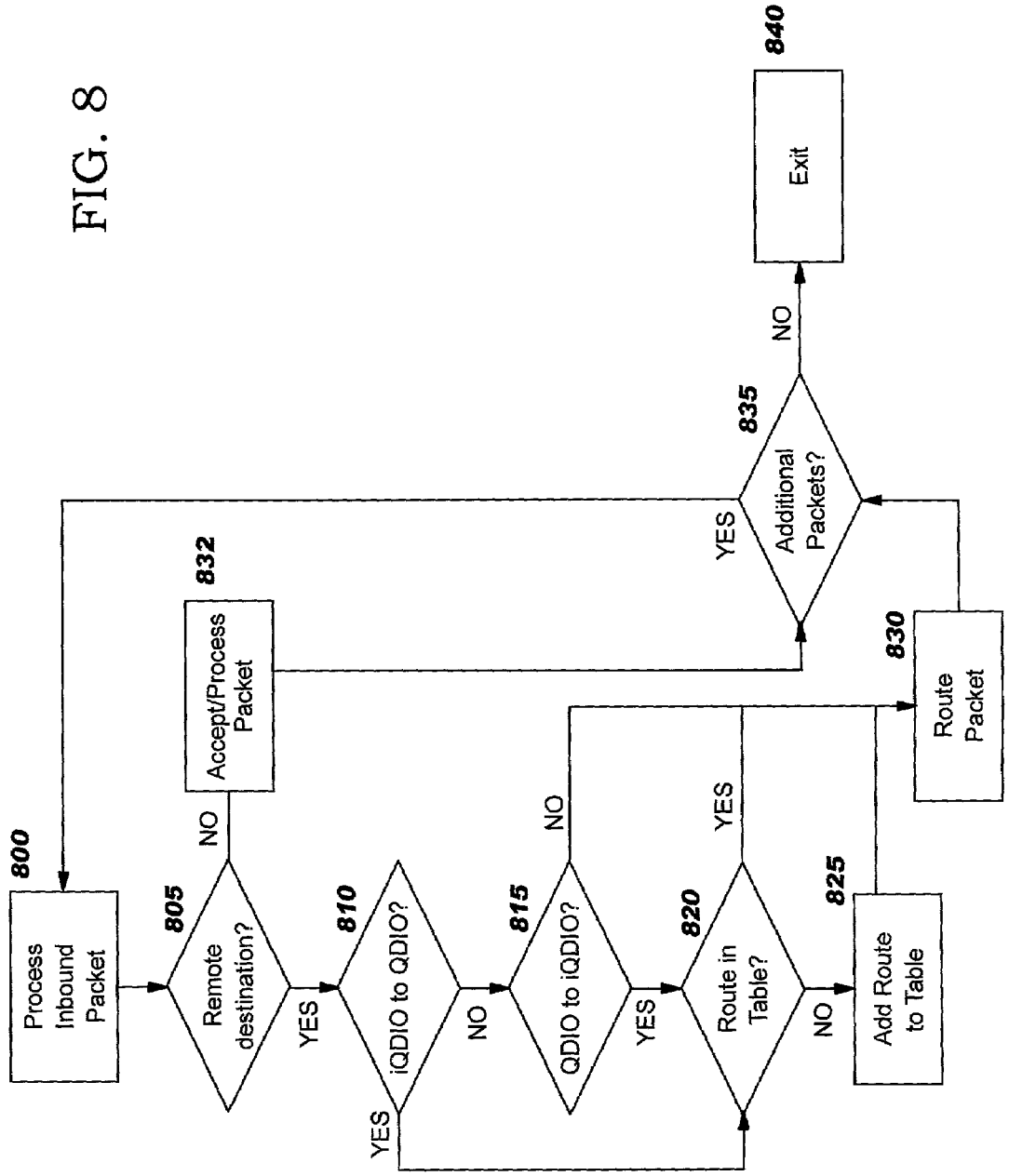
Figure 9:
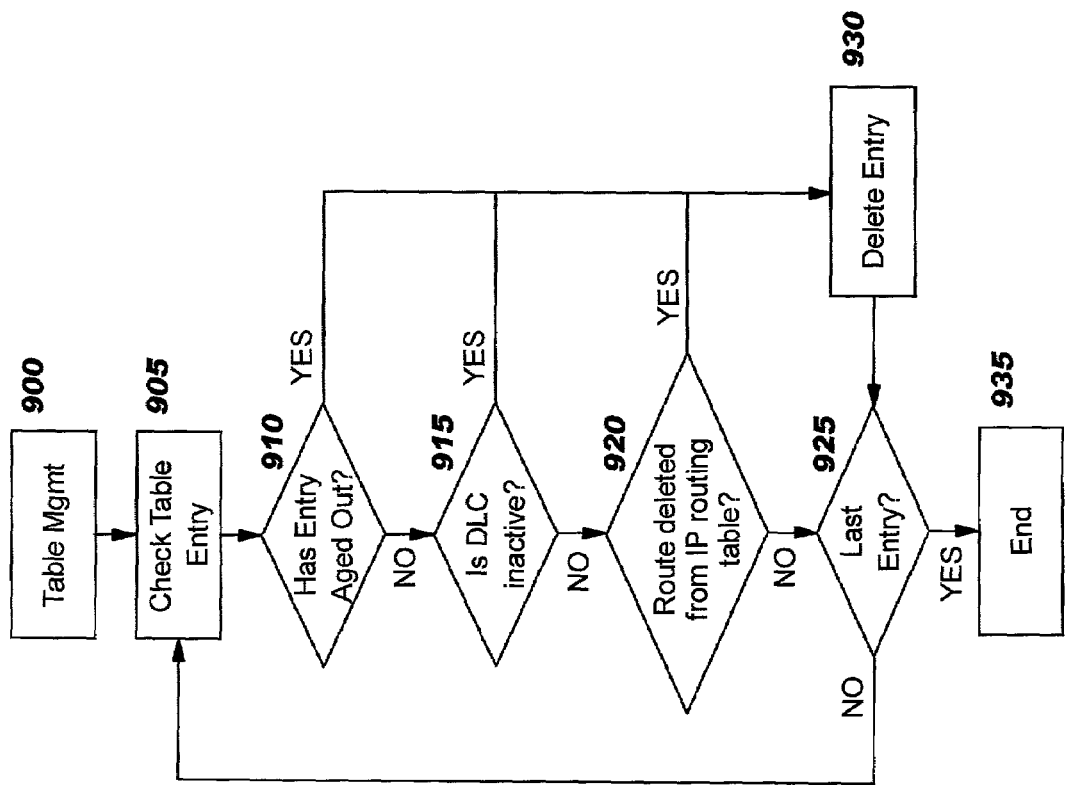

The mini-routing table preferably learns its entries dynamically, as stated earlier. Thus, the first time that a packet for a particular supported DLC is forwarded to the IP layer of the stack during the processing represented by Block 630, the stack (as augmented according to the present invention) creates an entry in the mini-routing table. FIG. 8, described below, provides logic which may be used for this purpose. (Note that the mini-routing table must be kept synchronized with the full routing table used by the stack, and therefore FIG. 9 provides logic for monitoring to ensure that the contents of the mini-routing table are current.)

Referring again to FIG. 6, after a packet is routed to the IF layer and IP layer in Block 630, Block 625 looks for the next packet in the current SBAL. Block 615 checks to see if another packet was found. If so, the processing of this packet continues by transferring control to Block 620. Otherwise, when there were no more packets in the current SBAL, Block 605 checks to see if there are more SBALs to process. If so, control transfers to Block 610 to get the next SBAL. When there are no more SBALs, the test in Block 605 has a negative result and control transfers to Block 700 of FIG. 7 to perform DLC routing operations.

Returning to the discussion of Block 640, which is reached after determining that fast path routing is to be performed according to the present invention, Block 640 preferably performs checks related to packet copying. When preparing a packet for transmission, there may be several cases in which it is necessary to create a copy of the packet;

in other cases, the packet can be transmitted without making a copy. As a first example of when creating a copy may be necessary, an implementation of the present invention might support a DLC for which the DLC-out type has a larger packet header length than the DLC-in type. In this first case, it is necessary to copy the inbound packet to separate storage to accommodate the larger packet header length of the outbound packet. (As will be obvious, the processing of Block 640 is preferably adapted to determining packet lengths.) As a second example of when creating a copy may be necessary (or at least desirable), it may happen that some of the packets within a storage frame are going to different DLC-out types. In addition, some of the packets from the frame may need to be sent to the IP layer for routing as in the prior art (i.e. if fast path routing is not supported with their DLC). In order that the storage frame is not released before its "mixture" of packets is completely processed, it is preferable in this second case to copy the packets to separate storage areas. It may also be desirable to copy packets for which the exiting DLC (i.e. the DLC-out) uses a "real" adapter to transfer data to an external network. An example is illustrated by element 450 of FIG. 4, which represents a QDIO Network Interface Card (NIC).

Conversely, making copies may be bypassed in cases where it is known that all the packets from the storage frame are going to the same DLC-out (because all the packets can be transmitted in an asynchronous I/O operation), and when the DLC-out has the same packet header length as the DLC-in (because the outbound packet header can be built in the same storage space occupied by the inbound packet header). In addition, when the DLC-out type is iQDIO (that is, this is an inbound packet for one of the virtual servers, and is being routed to the concentrator or VIN 220), then the I/O is synchronous, and the synchronous I/O can be completed before dealing with the packets which must be routed through the IP layer of the stack.

A particular implementation of the present invention may use additional and/or different criteria for making the determination in Block 640. When the test(s) indicate that copying is to be done, then Block 645 makes the copy. In either case, after making a copy of the packet or when a copy is not needed, processing continues at Block 650, which uses the routing information from the matching entry of the mini-routing table (located at Block 635) to build the header information in an outbound version of this packet. After building the packet header, control transfers to Block 625 to locate the next packet in the current SBAL.

In an implementation of the present invention wherein the supported DLCs comprise iQDIO and QDIO, the outbound packet header may be built within the same storage frame as the inbound packet. Therefore, the logic of the test in Block 640 is preferably constructed such that the packets may be updated in place instead of copied to separate storage at Block 645. This may result in a single storage frame containing a mixture of packets that are being routed using fast path routing, and packets which must be routed by forwarding them to the stack. In this case, the DLC routing exit sends the storage frame to the IF layer 475, which preferably interrogates the indicator of each packet in the frame to determine whether it actually needs to be forwarded to the IP layer 470 for routing. If the bit is set to indicate that fast path routing was performed, then the IF layer 475 does not need to forward the packet to the IP layer 470. This technique will now be described with reference to the logic in FIG. 7.

Figure 7:
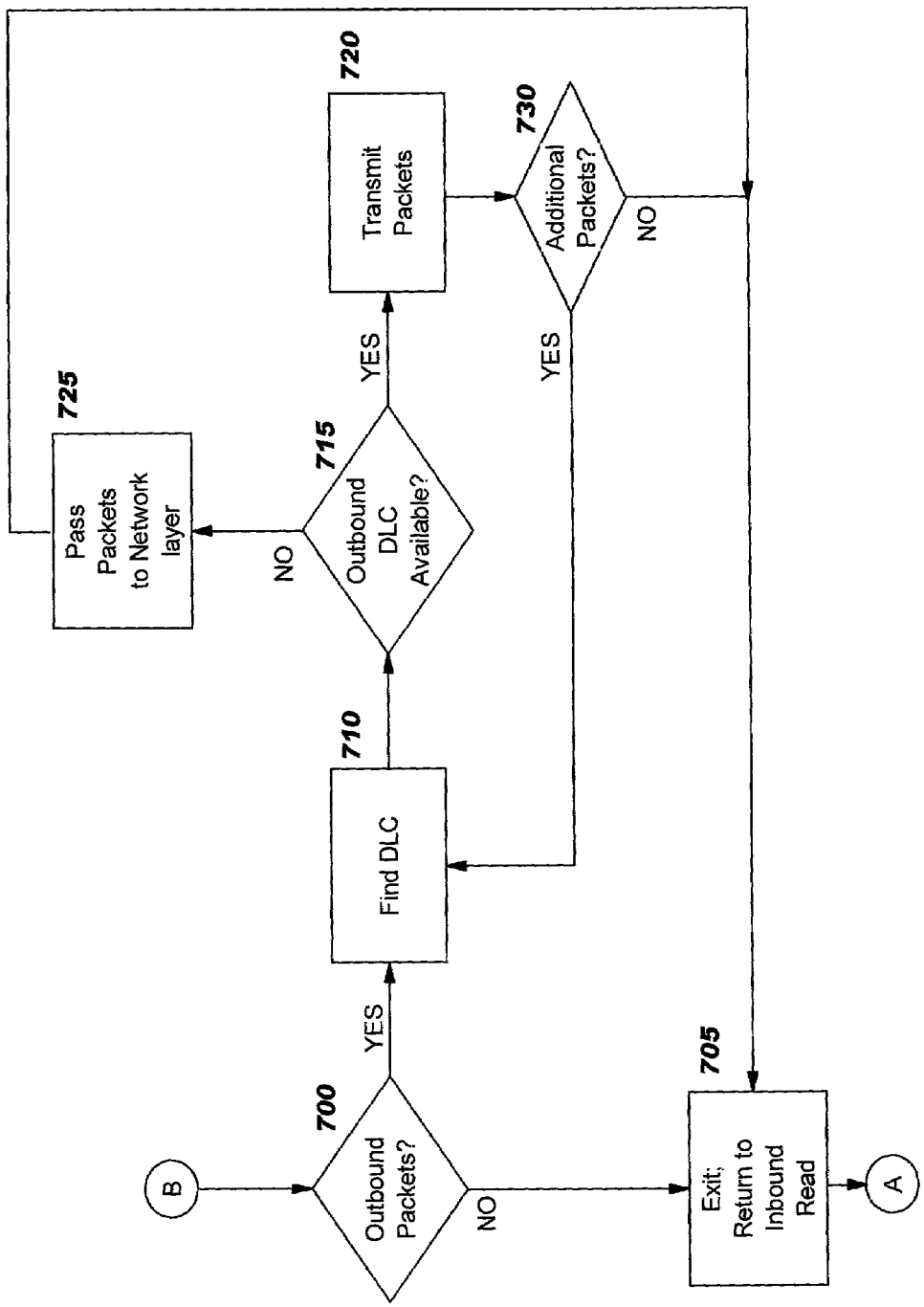

The logic depicted in FIG. 7 performs fast path DLC routing in the DLC routing exit logic, according to preferred embodiments of the present invention. The test in Block 700 checks to see if there are outbound packets to process. If not, then as shown by Block 705, control returns to Block 600 of FIG. 6 to process inbound packets. When there are outbound packets to process, Block 710 searches for the DLC to be used for transmitting these packets. Block 715 asks whether this outbound DLC is available. If not, then the packets are passed (Block 725) to the network layer (e.g., IP layer 470 of FIG. 4) for routing as in the prior art, after which control returns to Block 705.

When the outbound DLC is available, on the other hand, Block 720 transmits the packets to that DLC. This transmission corresponds to the fast path routing illustrated by arrow 435 of FIG. 4. (For traffic that is inbound to one of the virtual servers, as will be obvious, traffic flows in the opposite direction of arrow 435, which is depicting outbound traffic.) In this manner, the fast path routing process of the present invention routes traffic between a VIN (with virual servers attached) and a real network, and operates at the data link control layer. After transmitting the packets, Block 730 then checks to see if there are more outbound packets to be processed. If so, control returns to Block 710 to continue processing those packets; otherwise, control transfers to Block 705.

FIGS. 8 and 9 illustrate logic which may be used to add entries to the mini-routing table and to keep the table synchronized with the normal IP routing table, respectively. Preferably, this logic operates in the stack (for example, in IP layer 470). A preferred format for entries in the mini-routing table is described below with reference to FIG. 10.

The table processing logic in FIG. 8 begins at Block 800, where a packet is being processed. As stated above with reference to Block 630 of FIG. 6, the first time that a packet for a particular supported DLC is forwarded to the IP layer of the stack, an entry is created in the mini-routing table. Block 805 checks the destination address in the packet to see if the packet is for a remote destination (that is, a destination outside the host). When this test has a negative result, the packet is for this stack, and therefore control transfers to Block 832; otherwise, the packet needs to be routed (i.e. forwarded) to another stack based on information in this stack's routing table (using prior art routing techniques), and processing continues at Block 810.

Block 810 checks to see if the entering (i.e. inbound or source) DLC, i.e. the DLC-in, of the packet is iQDIO and the exiting (i.e. outbound or destination) DLC, i.e. the DLC-out, as determined from looking up this destination in the stack's routing table, is QDIO. If so, then control transfers to Block 820; otherwise, Block 815 checks to see if the DLC-in is QDIO while the DLC-out is iQDIO. (As stated earlier, if other DLC-out types are supported, then the logic of Blocks 810 and 815 is adapted accordingly.) If either of the tests in Blocks 810 and 815 has a positive result, then this packet is for a DLC-in, DLC-out pair that is supported, and fast path routing can be performed once an entry for these DLCs is created in the mini-routing table. Thus, Block 820 checks to see if the route for this entering/exiting DLC pair is already present in the mini-routing table. If it is not, then Block 825 adds the entry (see the discussion of FIG. 10, below), and at Block 830, the stack then routes the packet as in the prior art. Processing then continues at Block 835.

When the test in Block 815 has a negative result, and also when the test in Block 820 has a positive result, control transfers to Block 830, and the packet will be routed using prior art techniques.

Control reaches Block 832 when the test in Block 805 has a negative result, indicating that this packet is destined for the present stack. Block 832 therefore accepts/processes the packet, after which processing continues at Block 835.

Block 835 checks to see if there are any additional packets to be processed. If so, control returns to Block 800 to analyze and process the next packet; otherwise, the logic of FIG. 8 is exited (as shown by Block 840).

The table synchronization process in FIG. 9 begins at Block 900, where the table management function has been invoked. Preferably, a timer-driven or interrupt-driven mechanism is used to periodically invoke this processing. The manner in which the processing is invoked, and its timing, may vary from one implementation to another without deviating from the scope of the present invention. Note that while FIG. 9 represents several tests as occurring sequentially, if these processes are implemented using interrupts, then the processing for each interrupt may occur in a stand-alone manner.

Block 905 obtains the next entry in the mini-routing table, in preparation for checking it. Block 910 then checks to see if this entry has aged out. If so, the entry is deleted by transferring control to Block 930. If not, Block 915 checks to see if the DLC represented by this entry is currently inactive. If not, Block 920 checks to see if the corresponding route has been deleted from the IP routing table. When any of the conditions tested in Blocks 910, 915, and 920 are true, the entry is deleted (Block 930). Otherwise, if none of these conditions are true, then Block 925 checks to see if this was the last entry in the mini-routing table. If so, then the table management routine ends (Block 935); otherwise, control returns to Block 905 to obtain the next entry and begin its processing.

It may be preferable to perform some table maintenance operations in a more direct manner—for example, upon occurrence of an event that affects the table contents—rather than waiting for a general table maintenance routine to be invoked. Thus, the processing in FIG. 9 is intended to be representative of table maintenance logic, and is not meant to limit the maintenance procedure to a sequential or timer-driven approach. For example, when a DLC becomes inactive, the table entries which have this DLC as either DLC-in or DLC-out may be immediately purged from the mini-routing table. This condition corresponds to the test in Block 915. As another example, if a route in the stack's IP routing table is deleted for any reason, then the corresponding entries in the mini-routing table may be immediately deleted. This condition corresponds to the test in Block 920.

Referring now to FIG. 10, a preferred format for entries in the mini-routing table is illustrated. (As will be obvious, this format is presented for purposes of illustration and not of limitation. For a particular implementation of the present invention, it may be desirable to use different fields, additional fields, and/or fewer fields. Furthermore, data structures other than tables may be used.)

At a minimum, each entry 1010 in the mini-routing table 1000 must have a destination IP address 1011 (which is used in preferred embodiments as the index into the table during operation of Block 820), a DLC-in value 1012, and a DLC-out value 1013. Other fields, represented by column 1014, may be present as necessary or desirable for a particular implementation. The first time a packet is forwarded from a particular DLC-in to a particular DLC-out, as shown in the example table 1000 using DLC-in as "X" 1022 and DLC-out as "Y" 1023, a row 1020 (or corresponding storage element in another type of data structure) is created. If a packet is subsequently forwarded between the same DLCs in the opposite direction, then an additional row 1030 is created where the roles are reversed.

Hence, it has been shown that the present invention performs routing at the DLC layer, thereby avoiding the bottleneck situation for routing packets in the TCP/IP stack which may occur in the prior art. Data transfer operations are thereby enhanced, resulting in faster delivery of data.

Referring again to the environment shown in FIG. 4, an additional benefit of using a z/OS image for processing the routing enhancements of the present invention lies in opening up many legacy DLCs for use with Linux images. z/OS has existing support for many DLCs, such as X.25, CLAW (Common Link Access to Workstations), CDLC (Channel Data Link Control), and LCS (LAN Channel Station). Implementing many of these protocols in a Linux system would be cost-prohibitive, yet as Linux grows in use, its ability to work with many legacy DLCs will be important. Therefore, use of z/OS as a DLC access means for Linux virtual servers according to the present invention provides this interoperability without requiring additional DLC-specific code.

As has been demonstrated, the present invention provides advantageous techniques for improving efficiency of data transfer within virtual networks by optimizing internal routing operations. The routing occurs within a server which hosts multiple virtual servers, and preferably operates as a single software entity to route traffic to an adapter or network interface card. The virtual servers whose traffic is being processed in this manner are typically functioning as application servers. The approach of the present invention is to be contrasted with prior art routing accelerator techniques which operate in physical router devices (and which are sometimes referred to as "blades" of a router).

As will be appreciated by one of skill in the art, embodiments of the present invention may be provided as methods, systems, and/or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. In particular, it will be apparent to those of skill in the art that while preferred embodiments are described herein in terms of a particular mainframe computer (i.e. the z900) which supports particular operating systems, this is for purposes of illustration and not of limitation. Furthermore, references herein to use of the present invention for processing particular types of traffic such as TCP/IP data is for purposes of illustration and for conveying details of implementing the present invention. The disclosed techniques may be used advantageously in other computing environments, including with other computers, other operating systems, and other networking protocols, without deviating from the scope of the present invention. Therefore, it is intended that the appended claims shall be construed to include the described preferred embodiments and all such variations and modifications as fall within the spirit and scope of the invention.

What is claimed is:

1. A method of data transfer in a virtual server environment of a computing network, the method comprising:
   receiving a plurality of packets to be routed to or from a plurality of virtual servers operating in a single physical device;
   providing an internal routing table for data link layer routing to or from selected ones of the virtual servers, wherein entries in the internal routing table are learned dynamically while processing selected ones of the received packets at a network layer; and
   using the internal routing table for routing other ones of the received packets to or from the selected ones of the virtual servers at the data link layer,
   wherein:
      the selected ones of the received packets comprise, for each supported pair of input data link layer component and output data link layer component, a first-processed one of the packets which arrives using the input data link layer component and which is addressed to the output data link layer component; and
      the other ones of the received packets comprise, for each of the supported pairs of input data link layer component and output data link layer component, subsequently-processed ones of the packets which arrive using the input data link layer component and which are addressed to the output data link layer component.

2. A method of data transfer in a virtual server environment of a computing network, the method comprising:
   providing a concentrator that combines traffic from a plurality of virtual servers operating in a single physical device into a single outbound stream; and
   routing packets of the combined traffic, further comprising steps of:
      intercepting packets of the traffic at a data link layer of a communications protocol stack;
      comparing a destination address of each intercepted packet to entries in a data link layer routing table comprising at least one entry, each entry specifying an input data link layer component, output data link layer component pair, to determine if a matching entry is present in the table, the matching entry specifying a data link layer component on which the intercepted packet arrived as the input data link layer component of the pair and the destination address of the intercepted packet as the output data link layer component of the pair;
      forwarding the intercepted packet to a higher layer of the communications protocol stack if the matching entry is not found, for routing by the higher layer; and
      performing data link layer routing of the intercepted packet, without intervention of the higher layer, if the matching entry is found.

3. The method according to claim 2, wherein performing data link layer routing further comprises:
   replacing an inbound packet header of the intercepted packet with an outbound packet header using information from the matching entry, thereby creating a modified packet header; and
   forwarding the intercepted packet using the modified packet header.

4. The method according to claim 2, wherein the entries in the data link layer routing table are dynamically learned and further comprising:
   adding a new entry to the table for each of the intercepted packets for which the matching entry is not found and for which the data link layer component on which the intercepted packet arrived and the output data link layer component that matches the destination address of the intercepted packet are both supported, the new entry specifying the data link layer component on which the intercepted packet arrived as the input data link layer component of the pair and the output data link layer component that matches the destination address of the intercepted packet as the output data link layer component of the pair.

5. The method according to claim 2, wherein at least one of the virtual servers is an application server.

6. The method according to claim 2, wherein the virtual servers each operate in a logical partition within the single physical device.

7. The method according to claim 2, further comprising deleting selected entries from the data link layer routing table when the selected entries become obsolete.

8. A system for data transfer in a virtual server environment of a computing network, comprising:
   means for providing a concentrator that combines traffic from a plurality of virtual servers operating in a single physical device into a single outbound stream; and
   means for routing packets of the combined traffic, further comprising:
      means for intercepting packets of the traffic at a data link layer of a communications protocol stack;
      means for comparing a destination address of each intercepted packet to entries in a data link layer routing table comprising at least one entry, each entry specifying an input data link layer component, output data link layer component pair, to determine if a matching entry is present in the table, the matching entry specifying a data link layer component on which the intercepted packet arrived as the input data link layer component of the pair and the destination address of the intercepted packet as the output data link layer component of the pair;

means for forwarding the intercepted packet to a higher layer of the communications protocol stack if the matching entry is not found by the means for comparing, for routing by the higher layer; and means for performing data link layer routing of the intercepted packet, without intervention of the higher layer, if the matching entry is found by the means for comparing.

9. The system according to claim 8, wherein the means for performing data link layer routing further comprises:

means for replacing an inbound packet header of the intercepted packet with an outbound packet header using information from the matching entry, thereby creating a modified packet header; and means for forwarding the intercepted packet using the modified packet header.

10. The system according to claim 8, wherein the entries in the data link layer routing table are dynamically learned, the dynamic learning further comprising:

means for adding a new entry to the table for each of the intercepted packets for which the means for comparing does not find the matching entry and for which the data link layer component on which the intercepted packet arrived and the output data link layer component that matches the destination address of the intercepted packet are both supported, the new entry specifying the data link layer component on which the intercepted packet arrived as the input data link layer component of the pair and the output data link layer component that matches the destination address of the intercepted packet as the output data link layer component of the pair.

11. The system according to claim 8, wherein at least one of the virtual servers is an application server.

12. A computer program product for data transfer in a virtual sewer environment of a computing network, the computer program product embodied on computer-usable media having computer usable code embodied therewith, the computer program product comprising:

computer readable program code for providing a concentrator that combines traffic from a plurality of virtual servers operating in a single physical device into a single outbound stream; and computer readable program code for routing packets of the combined traffic, further comprising:

computer readable program code for intercepting packets of the traffic at a data link layer of a communications protocol stack;

computer readable program code for comparing a destination address of each intercepted packet to entries in a data link layer routing table comprising at least one entry, each entry specifying an input data link layer component, output data link layer component pair, to determine if a matching entry is present in the table, the matching entry specifying a data link layer component on which the intercepted packet arrived as the input data link layer component of the pair and the destination address of the intercepted packet as the output data link layer component of the pair;

computer readable program code for forwarding the intercepted packet to a higher layer of the communications protocol stack if the matching entry is not found by the computer readable program code for comparing, for routing by the higher layer; and computer readable program code for performing data link layer routing of the intercepted packet, without intervention of the higher layer, if the matching entry is found by the computer readable program code for comparing.

13. The computer program product according to claim 12, wherein the computer readable program code for performing data link layer routing further comprises:

computer readable program code for replacing an inbound packet header of the intercepted packet with an outbound packet header using information from the matching entry, thereby creating a modified packet header; and computer readable program code for forwarding the intercepted packet using the modified packet header.

14. The computer program product according to claim 12, wherein the entries in the data link layer routing table are dynamically learned, the dynamic learning further comprising:

computer readable program code for adding a new entry to the table for each of the intercepted packets for which the computer readable program code for comparing does not find the matching entry and for which the data link layer component on which the intercepted packet arrived and the output data link layer component that matches the destination address of the intercepted packet are both supported, the new entry specifying the data link layer component on which the intercepted packet arrived as the input data link layer component of the pair and the output data link layer component that matches the destination address of the intercepted packet as the output data link layer component of the pair.

15. The computer program product according to claim 12, wherein at least one of the virtual sewers is an application sewer.

* * * * *